(12) United States Patent
Rautschek et al.

(10) Patent No.: US 11,597,840 B2
(45) Date of Patent: Mar. 7, 2023

(54) EMULSIONS OF BETA-KETOCARBONYL-FUNCTIONAL ORGANOSILICON COMPOUNDS

(71) Applicant: WACKER CHEMIE AG, Munich (DE)

(72) Inventors: Holger Rautschek, Nuenchritz (DE); Anton Heller, Simbach (DE); Irmgard Hofbauer, Haiming (DE); Marco Kauschke, Glaubitz (DE); Jonas Schwarzkopf, Nuenchritz (DE)

(73) Assignee: WACKER CHEMIE AG, Munich (DE)

( * ) Notice: Subject to any disclaimer, the term of this patent is extended or adjusted under 35 U.S.C. 154(b) by 344 days.

(21) Appl. No.: 16/770,239

(22) PCT Filed: Dec. 6, 2017

(86) PCT No.: PCT/EP2017/081726
§ 371 (c)(1),
(2) Date: Jun. 5, 2020

(87) PCT Pub. No.: WO2019/110100
PCT Pub. Date: Jun. 13, 2019

(65) Prior Publication Data
US 2021/0163744 A1    Jun. 3, 2021

(51) Int. Cl.
C08G 77/26 (2006.01)
C08L 83/08 (2006.01)
C08G 77/14 (2006.01)
C08K 5/098 (2006.01)
C08K 5/5415 (2006.01)
D06M 15/643 (2006.01)

(52) U.S. Cl.
CPC ............ *C08L 83/08* (2013.01); *C08G 77/14* (2013.01); *C08G 77/26* (2013.01); *C08K 5/098* (2013.01); *C08K 5/5415* (2013.01); *D06M 15/6433* (2013.01); *D06M 15/6436* (2013.01); *C08L 2205/025* (2013.01); *C08L 2205/03* (2013.01); *D06M 2200/12* (2013.01)

(58) Field of Classification Search
CPC ........ C08G 77/26; C08G 77/16; C08G 77/28; D06M 15/6436; D06M 15/6433; C08K 5/098; C07D 305/12
See application file for complete search history.

(56) References Cited

U.S. PATENT DOCUMENTS 5,658,377 A * 8/1997 Craig .................. D06M 13/256
524/46
2002/0049296 A1    4/2002 Schafer et al.
2005/0215806 A1    9/2005 Heller et al.
2008/0293907 A1    11/2008 Herzig et al.
2009/0144912 A1    6/2009 Herzig et al.
2011/0024679 A1    2/2011 Herzig
2015/0112092 A1    4/2015 Fritz-Langhals
2016/0121239 A1    5/2016 Brehm et al.

FOREIGN PATENT DOCUMENTS

DE   102013210813 A1   12/2014

OTHER PUBLICATIONS

G. Engelhardt et al., Über die 1H-, 13C- und 29Si-NMR chemischen Verschiebungen einiger linearer, verzweigter und cyclischer Methylsiloxan-Verbindungen, Journal of Organometallic Chemistry, 1971, vol. 28, Issue 3, pp. 293-300, Elsevier, Amsterdam, Netherlands.
Elizabeth A. Williams, The Chemistry of Organic Silicon Compounds, Chapter 8: NMR Spectroscopy of organosilicon compounds, 1989, pp. 511-533, John Wiley & Sons, Ltd., Hoboken, NJ, United States.
Hans-Dieter Dörfler, Grenzflächen-und Kolloidchemie, 1994, p. 198, VCH, Weinheim.
Rudolf Heusch, Emulsions, Ullmann's Encyclopedia of Industrial Chemistry, 2000, pp. 1-58, Wiley-VCH Verlag GmbH & Co. KGaA, Weinheim, Germany.
Uwe Rietz et al., Centrifuge technology revolutionises adhesion testing, Dispersion Letters, 2013, vol. 4, pp. 1-4, LUM GmbH, Berlin, Germany.
IKA Dispersers Brochure, 2013, Werke GmbH & Co. KG, Staufen, Germany.
Roland Somborn, Dissolver, 2014, Roempp Chemie Lexikon, Germany.

* cited by examiner

*Primary Examiner* — Kuo Liang Peng
(74) *Attorney, Agent, or Firm* — Brooks Kushman P.C.

(57) ABSTRACT

Aqueous emulsions contain:
(A) β-ketocarbonyl-functional organosilicon compounds having at least one Si—bonded radical A of the formula $$(Si)\text{-}L^1\text{-}[X^1\text{-}L^2\text{-}]_y X^2 \qquad (I)$$

where
$L^1$ are divalent, Si—C-bonded $C_{1-18}$ hydrocarbon radicals,
$L^2$ are divalent $C_{1-6}$ hydrocarbon radicals,
$X^1$ is a radical —O—, —NZ—, —$NR^2$— or —S—,
$X^2$ is a radical —O—Z, —NH—Z, —$NR^2$—Z, —S—Z,
Z is a radical —C(=O)—$CHR^3$—C(=O)—$CH_2R^3$,
$R^2$ is a monovalent $C_{1-18}$ hydrocarbon radical,
$R^3$ is a monovalent, optionally substituted $C_{12}$ hydrocarbon radical atoms,
y is 0, 1, 2 or 3
(B) at least one salt of a saturated or unsaturated fatty acid having at least 10 carbon atoms, and
(C) water,
with the proviso that no nonionic emulsifier having an HLB of less than 15 is present.

16 Claims, No Drawings

EMULSIONS OF BETA-KETOCARBONYL-FUNCTIONAL ORGANOSILICON COMPOUNDS

CROSS REFERENCE TO RELATED APPLICATIONS

This application is the U.S. National Phase of PCT Appln. No. PCT/EP2017/081726 filed Dec. 6, 2017, the disclosure of which is incorporated in its entirety by reference herein.

BACKGROUND OF THE INVENTION

1. Field of the Invention

The invention relates to aqueous emulsions of β-ketocarbonyl-functional organosilicon compounds.

2. Description of the Related Art

Reaction products of amino-functionalized organosilicon compounds with diketenes are referred to as β-ketocarbonyl-functional organosilicon compounds. Compounds of this kind have been known for a long time.

US 2008/0293907 A1 describes a process for preparing β-ketocarbonyl-functional organosilicon compounds wherein diketene is reacted with organosilicon compounds containing amino groups in the presence of a compound which retards the reaction in order to prevent gelling. The examples use exclusively unsubstituted diketene, so giving compounds without alkyl radicals on the ß-ketocarbonyl moiety as oils which are liquid at 25° C. These products are suitable, for example, as adhesion promoters (fixing on substrates with amine or with metal ions), for producing polymers, and for crosslinking polyacrylates. Formulations for the application of these compounds are not described.

US 2009/0144912 A1 describes the treatment of leather with ß-ketocarbonyl-functional organosilicon compounds. Preferably, i.e., exclusively in the examples, application takes place from solutions in organic solvents. For reasons of occupational hygiene and environmental protection, and also of cost, this is a disadvantage and usually undesirable. ß-Ketocarbonyl-functional organosilicon compounds used are preferably, i.e., exclusively in the examples, those without alkyl radicals on the ß-ketocarbonyl moiety, as are obtained through the reaction of aminosiloxanes with unsubstituted diketene. The possibility of using emulsions is mentioned in principle. Possible emulsifiers preferred are anionic emulsifiers, and ethoxylated phosphoric esters, sarcosides or sulfosuccinates are mentioned. How these emulsions are prepared and applied is not taught by US 2009/0144912 A1.

US 2011/0024679 A1 describes waxlike β-ketocarbonyl-functional organosilicon compounds which are obtained by reaction of α, ω-aminopropyl-terminated organosilicon compounds with alkylketene dimer. The alkyl groups are relatively long-chain $C_{14}/C_{16}$ alkyl radicals. Owing to their high silicone fraction, in contrast to other silicone waxes, these compounds dissolve readily in relatively low-viscosity silicone oils (for example, dimethylpolysiloxane with trimethylsiloxane end groups and a viscosity of 35 mm²/s at 25° C.). Gellike mixtures of this kind find application, in particular, in cosmetics. No other applications or formulations are described.

US 2016/0121239 A1 describes a method for defoaming and/or preventing foaming of aqueous, surfactant-containing compositions by adding defoamer formulations, where the defoamer formulations described comprise wax-like β-ketocarbonyl-functional organosilicon compounds. These compounds were obtained by reaction of amino-functionalized organosilicon compounds with alkylketene dimer, the alkyl groups likewise being relatively long-chain $C_{14}/C_{16}$ alkyl radicals.

These defoamer formulations may in principle also be in the form of emulsions, in which case there ought to be at least one nonionic emulsifier present, such as sorbitan esters, polysorbate, ethoxylated alcohol or glycerol esters, for example. Specific examples relating to the formulation of such emulsions are not given in US 2016/0121239 A1.

The object was to provide aqueous formulations of β-ketocarbonyl-functional organosilicon compounds having relatively long-chain alkyl radicals, especially those with a melting point greater than 30° C., which possess sufficient storage stability, and are highly effective in hydrophobizing sheetlike textile structures, such as woven or nonwoven fabrics.

SUMMARY OF THE INVENTION

These and other objects are achieved by the invention, in which β-ketocarbonyl-functional organopolysiloxanes having long chain alkyl radicals are emulsified in water in the presence of a salt of a saturated or unsaturated fatty acid having at least 10 carbon atoms, in the absence of non-ionic emulsifiers having an HLB of less than 15.

DETAILED DESCRIPTION OF THE PREFERRED EMBODIMENTS

A subject of the invention are thus aqueous emulsions comprising
(A) β-ketocarbonyl-functional organosilicon compounds which comprise at least one Si-bonded radical A of the general formula $$(Si)\text{-}L^1\text{-}[X^1\text{-}L^2\text{-}]_y X^2 \qquad (I)$$

where
$L^1$ is identical or different and is a divalent, Si—C-bonded hydrocarbon radical having 1 to 18 carbon atoms,
$L^2$ is identical or different and is a divalent hydrocarbon radical having 1 to 6 carbon atoms,
$X^1$ is a radical of the formula —O—, —NZ—, —NR²— or —S—, preferably —NZ—,
$X^2$ is a radical of the formula —O—Z, —NH—Z, —NR²—Z, —S— Z, preferably —NH—Z,
Z is a radical of the formula —C(=O)—CHR³—C(=O)—CH$_2$R³,
$R^2$ is a monovalent hydrocarbon radical having 1 to 18 carbon atoms,
$R^3$ is a monovalent, optionally substituted hydrocarbon radical having at least 12 carbon atoms, preferably having at least 14 carbon atoms,
y is 0, 1, 2 or 3, preferably 0 or 1, more preferably 0, and
(Si)— denotes the bond to an Si atom,
(B) at least one salt of a saturated or unsaturated fatty acid having at least 10 carbon atoms, and
(C) water,
with the proviso that the accompanying use of nonionic emulsifiers having an HLB of less than 15 is ruled out.

The term "aqueous emulsion" means that the emulsions in question are oil-in-water (O/W) emulsions, in other words emulsions with water as the continuous phase and oil as the disperse phase. The term "oil" points to the water-insolubility of the disperse phase and says nothing about the melting point or viscosity of the substance forming this phase.

The HLB (HLB stands for hydrophilic-lipophilic balance) describes the hydrophilic and lipophilic function of primarily nonionic surfactants. The HLB for nonionic surfactants can be calculated in accordance with Hans-Dieter Dörfler, Grenzflächen- und Kolloidchemie, VCH, Weinheim, 1994, p. 198, as follows:

$$HLB = 20 \times \left(1 - \frac{M_1}{M}\right)$$

Here, $M_1$ is the molar mass of the lipophilic fraction of the surfactant molecule, and M is the molar mass of the whole molecule. The factor 20 is a freely selected scaling factor.

The aqueous emulsions of the invention preferably comprise at least 5 wt %, more preferably at least 10 wt %, and preferably at most 70 wt %, more preferably at most 60 wt %, yet more preferably at most 55 wt %, of ß-ketocarbonyl-functional organosilicon compounds (A), based in each case on the total weight of the aqueous emulsions.

The aqueous emulsions of the invention preferably comprise at least 1 part by weight, more preferably at least 3 parts by weight, most preferably at least 5 parts by weight, and preferably at most 25 parts by weight, more preferably at most 20 parts by weight, and most preferably at most 15 parts by weight, of salt(s) of a saturated or unsaturated fatty acid(s) having at least 10 carbon atoms (B), based on 100 parts by weight of the ß-ketocarbonyl-functional organosilicon compounds (A).

In addition to the salts of saturated or unsaturated fatty acids having at least 10 carbon atoms, the emulsions of the invention may comprise further emulsifiers (D), with the exception of nonionic emulsifiers having an HLB of less than 15. Also preferably excepted are salts of saturated or unsaturated fatty acids having fewer than 10 carbon atoms.

In the event of further emulsifiers (D) being present, the aqueous emulsions of the invention preferably comprise at least 1 part by weight, more preferably at least 2 parts by weight, and most preferably at least 4 parts by weight, and preferably at most 25 parts by weight, more preferably at most 20 parts by weight, and most preferably at most 15 parts by weight, of further emulsifiers (D), based in each case on 100 parts by weight of the ß-ketocarbonyl-functional organosilicon compounds (A).

The emulsions of the invention preferably contain no further emulsifiers (D).

The aqueous emulsions of the invention preferably comprise at least 1 wt %, more preferably at least 5 wt %, most preferably at least 10 wt %, and preferably at most 94.5 wt %, more preferably at most 85 wt %, and most preferably at most 80 wt %, of water (C), based in each case on the total weight of the aqueous emulsions.

The aqueous emulsions of the invention may, besides (A), (B), (C), and (D),
optionally comprise further ingredients, such as
(E) nonaqueous solvents or coemulsifiers and
(F) auxiliaries preferably selected from the group of pH regulators, foam inhibitors, thickeners, protective colloids, preservatives, disinfectants, wetting agents, corrosion inhibitors, dyes, fragrances, non-(A) siloxanes, and mixtures thereof.

The aqueous emulsions of the invention preferably have particle sizes D(50) (median of the volume distribution) of less than or equal to 2.0 µm, more preferably less than or equal to 1.0 µm, and most preferably less than 0.5 µm. The particle size here is determined with a Malvern Mastersizer 2000 (Malvern Instruments GmbH D-Herrenberg; measurement principle: Fraunhofer diffraction in accordance with ISO 13320). A parameter assumed for the measurement is a spherical model with a continuous phase refractive index of 1.33, a disperse phase refractive index of 1.39, and an absorption of 0.01.

The β-ketocarbonyl-functional organosilicon compounds (A) used in the aqueous emulsions of the invention may be oligomeric or polymeric organosiloxanes, preferably organopolysiloxanes. They contain preferably at least 3, more preferably at least 5, and most preferably at least 10 Si atoms, and preferably up to 2000 Si atoms, more preferably up to 1000 Si atoms, and most preferably up to 700 Si atoms.

Preferred as the β-ketocarbonyl-functional organosilicon compounds (A) used are organopolysiloxanes consisting of units of the general formula $$A_a R_b (OR^{-1})_c SiO_{\frac{4-(a+b+c)}{2}} \qquad (II)$$

where
A is a radical of the formula (I),
R is a monovalent, optionally substituted hydrocarbon radical having 1 to 18 carbon atoms per radical,
$R^1$ is a hydrogen atom or an alkyl radical having 1 to 8 carbon atoms,
a is 0 or 1
b is 0, 1, 2 or 3, and
c is 0 or 1,
with the proviso that the sum a+b+c is not more than 3 and there is on average at least one radical A per molecule.

More preferred as β-ketocarbonyl-functional organosilicon compounds (A) are organopolysiloxanes of the general formula $$A_d R^4_{(3-d)} SiO(SiR_2O)_e(SiR^4AO)_f SiR^4_{(3-d)} A_d \qquad (III),$$

where
A is a radical of the formula (I),
R and $R^1$ have the definition stated for them above,
$R^4$ is identical or different and is a radical R or $-OR^1$,
d is 0 or 1, preferably 0,
e is 0 or an integer from 1 to 2000, and
f is 0 or an integer from 1 to 20,
with the proviso that there is on average at least one radical A per molecule and that, respectively,
if d is 0, f is not 0, and
if f is 0, d is 1.

The β-ketocarbonyl-functional organosilicon compounds (A) used in the composition of the invention may be waxlike solids or liquids. In the latter case they preferably have a viscosity of 1 to 1,000,000 mPa·s at 25° C., more preferably 100 to 50,000 mPa·s at 25° C.

The β-ketocarbonyl-functional organosilicon compounds (A) are preferably waxlike solids having a melting point or melting onset at greater than 30° C., especially greater than 40° C.

The β-ketocarbonyl-functional organosilicon compounds (A) are known and are described in US 2011/0024679 A1 and/or US 2016/0121239 A1 (incorporated by reference), including their preparation.

The β-ketocarbonyl-functional organosilicon compounds (A) used are preferably prepared by reaction of organosilicon compounds (1) having at least one radical B of the general formula $$(Si)-L^1-[X^3-L^2-]_y X^4 \qquad (IV)$$

with diketenes (2) of the general formula

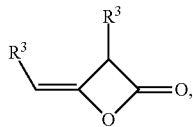

(V)

where $X^3$ is a radical of the formula —O—, —NH—, —NR²— or —S—, preferably —NH—, $X^4$ is a radical of the formula —OH, —NH$_2$, —NR²H or —SH, preferably —NH$_2$, $R^2$, $R^3$, $L^1$, $L^2$, y, and (Si)— have the definition stated for them above.

Preferred for use as organosilicon compounds (1) are organopolysiloxanes consisting of units of the general formula $$B_g R_h (OR^{-1})_k SiO_{\frac{4-(g+h+k)}{2}} \qquad (VI)$$

where

B is a radical of the formula (IV),

R is a monovalent, optionally substituted hydrocarbon radical having 1 to 18 carbon atoms per radical, $R^1$ is a hydrogen atom or an alkyl radical having 1 to 8 carbon atoms, g is 0 or 1, h is 0, 1, 2 or 3, and k is 0 or 1, with the proviso that the sum g+h+k is not more than 3 and there is on average at least one radical B per molecule.

Preferred examples of organosilicon compounds (1) are organopolysiloxanes of the general formula $$B_l R^4_{(3-l)} SiO(SiR_2 O)_m (SiR^4 BO)_n SiR^4_{(3-l)} B_l \qquad (VII),$$

where

B is a radical of the formula (IV),

R and $R^1$ have the definition stated for them above, $R^4$ is identical or different and is a radical R or —OR¹, l is 0 or 1, preferably 0, m is 0 or an integer from 1 to 2000, and n is 0 or an integer from 1 to 20, with the proviso that there is on average at least one radical B per molecule and that, respectively, if l is 0, n is not 0, and if n is 0, l is 1.

The organosilicon compounds (1) preferably have a viscosity of 1 to 1,000,000 mPa·s at 25° C., more preferably 100 to 50,000 mPa·s at 25° C., most preferably 2000 to 20,000 mPas at 25° C.

The organosilicon compounds (1) are preferably amino-functional organosilicon compounds having an amine number of 0.01 to 1.0 mmol/g, more preferably 0.03 to 0.3 mmol/g.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl, and methylcyclohexyl radicals; alkenyl radicals, such as the vinyl, 5-hexenyl, cyclohexenyl, 1-propenyl, allyl, 3-butenyl, and 4-pentenyl radicals; alkynyl radicals such as the ethynyl, propargyl, and 1-propynyl radicals; aryl radicals, such as the phenyl, naphthyl, anthryl, and phenanthryl radicals; alkaryl radicals such as o-, m-, and p-tolyl radicals, xylyl radicals, and ethylphenyl radicals; and aralkyl radicals such as the benzyl radical, and the α- and the β-phenylethyl radicals.

Preferably the radical R is a methyl or phenyl radical.

Examples of radicals $R^1$ are hydrogen, or alkyl radicals such as the methyl, ethyl, n-propyl, isopropyl, 1-n-butyl, 2-n-butyl, isobutyl, tert-butyl, n-pentyl, isopentyl, neopentyl, or tert-pentyl radicals, hexyl radicals such as the n-hexyl radical, heptyl radicals such as the n-heptyl radical, octyl radicals such as the n-octyl radical, and isooctyl radicals such as the 2,2,4-trimethylpentyl radical.

Preferred examples of $R^1$ are the hydrogen atom or the methyl or the ethyl radical.

Examples of hydrocarbon radicals R are also valid for hydrocarbon radicals $R^2$.

The radical $R^3$ is a monovalent, optionally substituted hydrocarbon radical having at least 12 carbon atoms, preferably having at least 14 carbon atoms, and preferably at most 18 carbon atoms.

The radical $R^3$ preferably has 14 to 16 carbon atoms, and more preferably is a $C_{14}$-$C_{16}$ alkyl radical.

Examples of radicals $R^3$ are the dodecyl, tetradecyl, hexadecyl, and octadecyl radicals.

Examples of $L^1$ are divalent hydrocarbon radicals such as the methylene group, the 1,2-ethylene group, the 1,3-propylene group, the 1,3-butylene group, the 1,4-butylene group, the 1,5-pentylene group, and the 1,6-hexylene group.

Particularly preferred examples are the 1,3-propylene group and the 1,3-butylene group.

Examples of $L^2$ are divalent hydrocarbon radicals such as the 1,2-ethylene group, the 1,3-propylene group, the 1,3-butylene group, the 1,4-butylene group, the 1,5-pentylene group, and the 1,6-hexylene group.

A particularly preferred example is the 1,2-ethylene group.

Examples of radicals B are
 —CH$_2$CH$_2$CH$_2$OH,
 —CH$_2$OCH$_2$CH$_2$OH,
 —CH$_2$CH$_2$CH$_2$OCH$_2$CH$_2$OH,
 —CH$_2$CH$_2$CH$_2$SH,
 —CH$_2$CH$_2$CH$_2$NH$_2$,
 —CH$_2$CH$_2$CH$_2$NHCH$_3$,
 —CH$_2$CH(CH$_3$) NH$_2$,
 —CH$_2$CH$_2$CH(CH$_3$) NH$_2$, and
 —CH$_2$CH$_2$CH$_2$NHCH$_2$CH$_2$NH$_2$.

The radical B is preferably —CH$_2$CH$_2$CH$_2$NH$_2$ or —CH$_2$CH$_2$CH$_2$NHCH$_2$CH$_2$NH$_2$.

The radical B is preferably —CH$_2$CH$_2$CH$_2$NH$_2$.

Diketene (2) is preferably used in amounts of 0.5 to 1.5 mol, more preferably 0.7 to 1.2 mol, per mole of the sum total of $X^3$ and $X^4$ groups containing hydrogen atoms in the radical B of the formula (IV) of the organosilicon compound (1).

The diketenes (2) are compounds which are solid at room temperature, and so reaction thereof with compounds (1) preferably takes place with heating, preferably at 50 to 100° C., so that the diketenes (2) are in the molten state. An alternative possibility is to use solvents, though that procedure is not preferred.

The process of the invention is preferably carried out under the pressure of the surrounding atmosphere, in other words at approximately 1020 hPa. It may, however, also be carried out at higher or lower pressures.

The ß-ketocarbonyl-functional organosilicon compounds (A) used in the emulsions of the invention contain impurities resulting from the preparation process. These may be unreacted organosilicon compounds (1), unreacted diketenes (2), or else the impurities present in the preparation of (1) and (2). Nonlimiting examples of such impurities are carboxylic acids and their derivatives, residues of solvents, low molecular mass linear or cyclic siloxanes and polydimethylsiloxanes without functional groups.

The fatty acid salts (B) used in the aqueous emulsions of the invention are salts of fatty acids preferably having at least 12 carbon atoms, more preferably at least 16 carbon atoms, and preferably at most 30 carbon atoms, more preferably at most 20 carbon atoms.

Examples of the fatty acid salts (B) used in the aqueous emulsions of the invention are salts of dodecanoic acid (lauric acid), of hexadecanoic acid (palmitic acid), of octadecanoic acid (stearic acid), of (9Z)-octadec-9-enoic acid (oleic acid), of (9Z,12Z)-octadeca-9,12-dienoic acid (linoleic acid), and of docosanoic acid (behenic acid).

Within the emulsions of the invention, the fatty acids are preferably present in the form of salts of alkali metal or alkaline earth metal hydroxides, ammonia or amines.

Examples of bases suitable for forming salts are salts such as alkali(ne earth) metal hydroxides, e.g., sodium hydroxide, potassium hydroxide, and lithium hydroxide, alkali(ne earth) metal carbonates, e.g., potassium carbonate, sodium carbonate, and lithium carbonate, ammonia, organic amines, e.g., triethanolamine (TEA), triethylamine, and isopropylamine, 2-butylaminoethanol and 2-dibutylaminoethanol, or aqueous solutions thereof.

Particularly preferred is triethanolamine.

The ratios of fatty acids and bases are preferably substantially equimolar. Depending on the desired pH, however, either the fatty acid or the base may be present in excess, so that either free fatty acids or free bases are present according to the known acid-base equilibria. The establishment of the pH with further acids, such as acetic acid, or with bases, though likewise possible, is not preferred, since it introduces unnecessary electrolytes into the emulsion, and this may be negative for the stability. In this case as well, the acid-base equilibria of all of the acids and bases involved would be established.

The emulsions of the invention preferably have a pH of 6 to 11, more preferably 7 to 9.

As water (C) it is possible to use all kinds of water which have also been used to date to prepare emulsions.

Employed as water (C) is preferably partly or fully demineralized water, distilled or (multiply) redistilled water, waters for medical or pharmaceutical use, such as, for example, purified water (Aqua purificata according to Pharm. Eur.).

The water (C) used in accordance with the invention preferably has a conductivity of less than 50 µS/cm, more preferably less than 10 µS/cm, and most preferably less than 1.3 µS/cm, in each case at 25° C. and 1010 hPa.

Examples of further emulsifiers (D) used in the aqueous emulsions of the invention are:
1. Alkyl polyglycol ethers, carboxylic acid polyglycol esters ethoxylated castor oil or hydrogenated variants alkylaryl polyglycol ethers with an HLB>15.
2. Polyvinyl alcohol still containing 5 to 50%, preferably 8 to 20%, vinyl acetate units, having a degree of polymerization of 500 to 3000.
3. Adducts of alkylamines having alkyl radicals of 8 to 22 carbon atoms with ethylene oxide or propylene oxide.
4. Natural substances and derivatives thereof, such as lecithin, lanolin, saponins, cellulose; cellulose alkyl ethers and carboxyalkylcelluloses, and the alkyl groups of which in each case possess up to 4 carbon atoms.
5. Linear organo(poly)siloxanes comprising polar groups, containing in particular the elements O, N, C, S, P, Si, more particularly those organo(poly)siloxanes having alkoxy groups with up to 24 carbon atoms and/or up to 40 EO and/or PO groups.
6. Alkyl sulfates, particularly those having a chain length of 8 to 18 carbon atoms, alkyl and alkaryl ether sulfates having 8 to 18 carbon atoms in the hydrophobic radical and 1 to 30 ethylene oxide (EO) and/or propylene oxide (PO) units.
7. Sulfonates, particularly alkylsulfonates having 8 to 18 carbon atoms, alkylarylsulfonates having 8 to 18 carbon atoms.

Further ingredients used in the aqueous emulsions of the invention may be
(E) nonaqueous solvents or coemulsifiers.

The aqueous emulsions of the invention, if they do comprise nonaqueous solvents (E), then comprise
(E) nonaqueous solvents or coemulsifiers in an amount of preferably at least 0.1 wt %, more preferably at least 0.4 wt %, most preferably at least 0.8 wt %, and preferably at most 20 wt %, more preferably at most 15 wt %, most preferably at most 10 wt %.

The nonaqueous solvents (E) which may be used in the aqueous emulsions of the invention come, for example, from the group of the mono- or polyhydric alcohols, alkanolamines or glycol ethers.

Examples of solvents are ethanol, n- or isopropanol, butanols such as 1-butanol, 2-butanol or 2-methyl-2-propanol, pentanols such as 1-pentanol, 2-pentanol or 3-pentanol, hexanols such as 1-hexanol, 2-hexanol or 3-hexanol, heptanols such as 1-heptanol, 2-heptanol, 3-heptanol or 4-heptanol, octanols such as 1-octanol, 2-octanol, 3-octanol or 4-octanol, glycol, propanediol, butanediols such as 1,2-butanediol or 1,3-butanediol, hexanediols such as 1,2-hexanediol or 2-methylpentane-2,4-diol, octanediols such as 2-ethylhexane-1,3-diol or 1,2-octanediol, glycerol, diglycol, propyl or butyl diglycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, propylene glycol n-butyl ether, propylene glycol tert-butyl ether, methoxytriglycol, ethoxytriglycol, butoxytriglycol, dipropylene glycol monomethyl ether, dipropylene glycol monoethyl ether, 1-butoxyethoxy-2-propanol or 3-methyl-3-methoxybutanol, 1-aminobutane, 2-aminobutane, 2-amino-2-methylpropane, 1-aminopentane, 2-aminopentane, 1-aminohexane, 1-aminoheptane, and 1-aminooctane; ethyl, propyl, isopropyl, butyl, isobutyl, pentyl, isopentyl, and hexyl acetate; methyl, ethyl, and tert-butyl propionate; methyl, ethyl, propyl, and butyl butyrate; 2-butanone, 2-pentanone, 3-pentanone, 4-methyl- 2-pentanone, 2-hexanone, 3-hexanone, 2-heptanone, 3-heptanone, 4-heptanone, 5-methyl-3-heptanone, 2-octanone, and 3-octanone, and also mixtures of these cosurfactants.

Examples of preferred nonaqueous solvents or coemulsifiers (E) are 1-alkanols of the above-recited examples with $C_5$ to $C_8$ chains, alkanediols of the above-recited examples with $C_4$ to $C_8$ chains, glycerol, propyl, butyl, and pentyl acetates, 2-pentanone, and also the above-recited ethylene, propylene, dipropylene or diethylene glycol monoalkyl ethers. Particularly preferred as nonaqueous solvents or coemulsifiers (E) are 1-pentanol, 1-hexanol, 1-octanol, propanediol, 1,3-butanediol, 1,2-hexanediol, 2-ethylhexane-1,3-diol, 1,2-octanediol, glycerol, diethylene glycol methyl ether, diethylene glycol ethyl ether, diethylene glycol mono-n-butyl ether or propylene glycol methyl ether.

It is further possible for polyalkylene glycols, such as polyethylene glycols (e.g., PEG600, PEG1000 or PEG6000) or polypropylene glycols (e.g., PPG2000) or else polyoxamines (copolymers of ethylene oxide and propylene oxide units which are bridged via an ethylenediamine core), such as Tetronic 701 or Tetronic 90R4 (available from Sigma-Aldrich), to be used as coemulsifiers, provided their HLB is greater than 15.

Preferably no nonaqueous solvents or coemulsifiers (E) are used.

Further ingredients that can be used in the aqueous emulsions of the invention are
(F) auxiliaries preferably selected from the group of pH regulators, non-(A) siloxanes, foam inhibitors, thickeners, protective colloids, preservatives, disinfectants, wetting agents, corrosion inhibitors, dyes, fragrances, and mixtures thereof.

Examples of foam inhibitors are soaps, paraffins or silicone oils.

Examples of preservatives are methylisothiazolinone, chloromethylisothiazolinone, benzylisothiazolinone, phenoxyethanol, methylparaben, ethylparaben, propylparaben, butylparaben, isobutylparaben, alkali metal benzoates, alkali metal sorbates, iodopropynyl butylcarbamate, benzyl alcohol, and 2-bromo-2-nitropropane-1,3-diol.

The emulsions of the invention preferably comprise less than 5 wt %, more preferably less than 1 wt %, of highly disperse precipitated or pyrogenic silicas, non-(A) siloxanes or silicone resins. More particularly the emulsions of the invention are free from highly disperse precipitated or pyrogenic silicas and non-(A) siloxanes or silicone resins.

A further subject of the invention is a method for producing the aqueous emulsions of the invention by mixing ß-ketocarbonyl-functional organosilicon compound (A), at least one salt of a fatty acid having at least 10 carbon atoms (B), water (C), optionally further emulsifiers (D), optionally coemulsifiers (E), and optionally auxiliaries (F), with the proviso that the accompanying use of nonionic emulsifiers having an HLB of less than 15 is ruled out.

The aqueous emulsions of the invention are preferably produced preferably by intensive mixing of the β-ketocarbonyl-functional organosilicon compound (A) with at least one salt of a fatty acid having at least 10 carbon atoms (B), water (C), optionally further emulsifiers (D), optionally coemulsifiers (E), and optionally auxiliaries (F).

Stable emulsions are formed. As a result, the β-ketocarbonyl-functional organosilicon compounds (A) are in finely distributed form.

The nature of the mixing of the components which are used for producing the emulsions of the invention is not very critical and can be performed in various orders.

However, depending on the components (A), (B), (C), optionally (D), optionally (E), and optionally (F), preferred procedures may come about, which should be tested in each individual case.

One favored method is the production of the aqueous polysiloxane emulsions via a stable preliminary emulsion comprising at least one salt of a fatty acid having at least 10 carbon atoms (B), water (C), optionally further emulsifiers (D), optionally coemulsifiers (E), and optionally auxiliaries (F), where less than 10 wt % of water, preferably less than 7.5 wt % of water (C), is used, based in each case on the sum total of β-ketocarbonyl-functional organosilicon compounds (A) and the emulsifiers (B) and optionally (D).

This preliminary emulsion is preferably generated by admixing and incorporating into the ß-ketocarbonyl-functional organosilicon compound (A) at least one salt of a fatty acid having at least 10 carbon atoms (B), optionally further emulsifiers (D), optionally coemulsifiers (E), and the above-indicated portion of water (C).

The aqueous emulsions of the invention are obtained, finally, by adding the remaining amount of water (C) and also any auxiliaries (F) to the preliminary emulsion produced.

It is preferred for the salts of a fatty acid having at least 10 carbon atoms to be formed only during the production of the preliminary emulsion, from the corresponding fatty acids and bases.

Where the ß-ketocarbonyl-functional organosilicon compounds (A) and/or the fatty acid used for forming the salts of a fatty acid having at least 10 carbon atoms (B), and/or any further emulsifiers (D), are substances which at 20° C. are waxlike or solid, the preliminary emulsion is produced at relatively high temperatures. The emulsifying operation for producing the preliminary emulsion is preferably carried out, accordingly, at temperatures of at least 20° C., more preferably at least 30° C., yet more preferably at least 40° C., and preferably at most 90° C., more preferably at most 80° C., and most preferably at most 70° C. It is necessary for the raw materials used to be heated to the corresponding temperature above the melting temperature before being incorporated, so as to enable metering.

The preliminary emulsion is produced with accompanying exposure to high shearing forces.

High shearing forces may be achieved, for example, by rotor-stator stirring devices or by dissolver disks. These are technologies which are known in the production of dispersions or emulsions of organopolysiloxanes. Homogenizing equipment and techniques of these kinds are described for example in Ullmann's Encyclopedia of Industrial Chemistry, CD-ROM edition 2003, Wiley-VCH Verlag, under the entry heading "Emulsions". Rotor-stator stirring devices consist of a rotor within a fixed stator. Through the slots between the rotor teeth, the product to be emulsified enters the shearing zone, which it leaves again via the stator slots. The narrow radial gap between rotor and stator, and the high peripheral speed of the rotating rotor, generate very large shear gradients (see, e.g., IKA Dispersers Brochure, 2013-05).

In dissolver disk stirrers, a toothed stirring disk is mounted on a vertical stirring shaft, and this disk is immersed into the product to be dispersed. Rotational movement of the disk produces shearing forces, which are likewise dependent on the peripheral speed (see, e.g., Rompp Chemie Lexikon online, 2014, Dissolvers section).

The peripheral speed of the rotor-stator homogenizers or of the dissolver disks when producing the preliminary emulsion is preferably 5 m/s, more preferably at least 10 m/s.

The preliminary emulsion is preferably a nonfluid paste of high viscosity. It is particularly preferred that the yield point (in accordance with DIN 53019-1 and standards cited therein) of this pasty premix is greater than 100 Pa (25° C.), more preferably greater than 1000 Pa (25° C.)

On dilution of the preliminary emulsion to form the end product, the shearing forces can be reduced, this being preferable.

Furthermore, the method of the invention is preferably carried out under the pressure of the surrounding atmosphere, but may also be carried out at higher or lower pressures.

The emulsions of the invention comprising β-ketocarbonyl-functional organosilicon compounds (A) may be produced semibatchwise or continuously.

One advantage of the aqueous emulsions of the invention over the prior art is their high storage stability. Storage-stable emulsions are those emulsions in which, after 30 days of storage at 50° C., preferably in a drying cabinet, there is no visible separation into two phases.

A further advantage of the aqueous emulsions of the invention is that they are miscible with amino-functional organosilicon compounds (G) or aqueous emulsions (G') thereof, without the resultant mixtures exhibiting any instability.

A further subject of the invention is a method for finishing fibrous substrates with compositions comprising aqueous emulsions of the invention comprising
β-ketocarbonyl-functional organosilicon compounds (A), fatty acid salts (B),
water (C),
optionally further emulsifiers (D),
optionally coemulsifiers (E), and
optionally auxiliaries (F).

The aqueous emulsions of the invention in particular are products which are safe to handle and are capable of providing fibers with washfast water repellency and a soft finish.

Examples of fibrous substrates are natural or synthetically produced fibers, yarns, skeins, cables, sheetlike textile structures such as nonwovens, mats, woven, knotted or knitted textiles, and also leather and leatherette. Preferred fibrous substrates are textiles.

For the application of the composition of the invention, the textiles may be present in the form of individual fibers, fiber bundles, fiberfill fibers, yarns, carpets, fabric webs or garments or parts of garments.

The textiles may consist of cotton, wool, copolymers of vinyl acetate, rayon, hemp, natural silk, polypropylene, polyethylene, polyester, polyurethane, polyamide, aramid, polyimide, polyacrylate, polyacrylonitrile, polylactide, polyvinyl chloride, glass fibers, ceramic fibers, cellulose or mixtures thereof.

Application to the textiles to be treated may take place in any desired manner which is suitable and widely known for the treatment of textiles; for example, by dipping, spreading, casting, spraying, rolling, padding, printing or foam application.

In the application, the composition of the invention may be combined with commonplace textile auxiliaries, such as, for example, binders comprising melamine resins or methylol resins, polyurethanes, polyacrylates, polyvinyl alcohols, polyvinyl acetates, optical brighteners, wetting assistants, defoamers, or further hydrophobizing and oleophobizing assistants such as perfluorinated hydrocarbons.

The treated textiles are allowed to dry, preferably at temperatures of 10° C. to 250° C., more preferably 25° C. to 200° C., and most preferably 80° C. to 180° C.

In the course of drying, the composition of the invention is possibly crosslinked and the treated textiles undergo impregnation, and are made water-repellent.

The use of the aqueous emulsion of the invention has the advantage that it permits very effective water repellency finishing of various textiles, that it is simple and safe to process, that it can be produced without substances that are long-term environmental pollutants, and that the water-repellent finish withstands washing very effectively.

Additionally, the aqueous emulsions of the invention can be used in combination with amino-functional organosilicon compounds (G) or aqueous emulsions (G') thereof for finishing fibrous substrates, in order to endow them with washfast water repellency and a soft finish.

The amino-functional organosilicon compounds (G) are preferably organosilicon compounds having at least one radical Q of the general formula $$(Si)\text{-}L^1\text{-}[X^5\text{-}L^2\text{-}]_z X^6 \qquad (VIII)$$

where
$X^5$ is a radical of the formula —NH— or —NR$^2$—, preferably —NH—,
$X^6$ is a radical of the formula —NH$_2$ or —NR H, preferably —NH$_2$,
z is 0, 1, 2 or preferably 0 or 1, more preferably 1, and
$R^2$, $L^1$, $L^2$, and (Si)— have the definition stated for them above.

It is possible to use one kind of amino-functional organosilicon compounds (G) or two or more kinds of amino-functional organosilicon compounds (G).

Amino-functional organosilicon compounds (G) or aqueous emulsions (G') thereof are commercial products which are known to the skilled person and are used in particular for improving the soft hand of textiles.

Preferred for use as amino-functional organosilicon compounds (G) are organopolysiloxanes of the general formula $$Q_u R^4_{(3-u)} SiO(SiR_2 O)_v (SiR^4 QO)_w SiR^4_{(3-u)} Q_u \qquad (X)$$

where
R and $R^4$ have the definition stated for them above,
Q is a radical of the formula (VIII),
u is 0 or 1,
v is 0 or an integer from 1 to 2000, and
w is 0 or an integer from 1 to 20,
with the proviso that there is on average at least one radical Q per molecule, meaning that, respectively,
if u is 0, w is not 0, and
if w is 0, u is 1.

Amino-functional organosilicon compounds (G) are preferably prepared by the processes described in US 2005/0215806 A1, US 2002/0049296 A1 or US 2015/0112092 A1.

Examples of radicals Q are
—CH$_2$CH$_2$CH$_2$NH$_2$,
—CH$_2$CH$_2$CH$_2$NHCH$_3$
—CH$_2$CH(CH$_3$) NH$_2$
—CH$_2$CH$_2$CH(CH$_3$) NH$_2$,
—CH$_2$CH$_2$CH$_2$NHCH$_2$CH$_2$NH$_2$, and
—CH$_2$CH(CH$_3$) CH$_2$NHCH$_2$CH$_2$NH$_2$.

Furthermore, the aqueous emulsions of the invention can be used in combination with amino-functional organosilicon compounds (G) or aqueous emulsions (G') thereof and in combination with organometallic compounds (H) for treating fibrous substrates, especially textiles, preferably in order to endow them with washfast water repellency and a soft finish.

Organometallic compounds (H) may be amines, alkoxides, carboxylic acid salts, phosphoric acid salts or chelates of metals selected from the group of Pb, Zn, Zr, Sb, Fe, Cd, Sn, Ti, Ba, Ca, Mn, V, Al, and Co.

Preference is given to using organometallic compounds of Zn, Zr, Ti, and of Al. Particularly preferred are organometallic compounds of Zr and Ti.

Examples of carboxylic acid salts are naphthenates, octoates, hexoates, laurates, acetates, formates, citrates, and lactates.

Preference is given to using alkoxides and carboxylic acid salts of titanium and zirconium.

Particularly preferred are butyl titanate, zirconium octoate, and zirconium acetate.

In the examples below, all data for parts and percentages, unless otherwise indicated, are given by weight.

Unless otherwise indicated, the following examples are carried out under a pressure of the surrounding atmosphere, in other words at approximately 101 kPa, and at room temperature, in other words approximately 20° C., or at a temperature which comes about when the reactants are brought together at room temperature without additional heating or cooling.

Dynamic viscosities were measured on an Anton Paar MCR 302 rheometer according to DIN EN ISO 3219: 1994 and DIN 53019, using a cone/plate system (CP50-2 cone) with an opening angle of 2°. The instrument was calibrated using standard oil 10 000 from the Physikalisch-Technische Bundesanstalt. The measurement temperature is 25.00° C.+/−0.05° C., the measuring time 3 minutes. The viscosity figure (reported in mPas) represents the arithmetic mean of three individual measurements carried out independently. The uncertainty of the dynamic viscosity measurement is 1.5%. The shear rate gradient was selected as a function of the viscosity, and is identified separately for each viscosity figure.

The testing of the pH of the emulsions was carried out using MColorpHast® pH 5.0-10.0 indicator strips from Merck KGaA Darmstadt.

The amine number reports the number of mmol of KOH that are equivalent to one gram of the substance under determination.

The amine number is determined according to DIN 16945, version 1989-03.

$^1$H NMR spectra are recorded as a solution in $CDCl_3$ on a Bruker Avance 500 NMR spectrometer (5 mm selective $^1$H NMR sample head) with a 500.13 MHz measuring frequency. Evaluation takes place in a manner known to the skilled person and described in the following literature: "Über die $^1$H—, $^{13}$C— und $^{29}$Si-NMR chemischen Verschiebungen einiger linearer, verzweigter und cyclischer Methyl-Siloxan-Verbindungen", G. Engelhardt, H. Jancke; J. Organometal. Chem. 28 (1971), 293-300; "Chapter 8-NMR spectroscopy of organosilicon compounds", Elizabeth A. Williams, The Chemistry of Organic Silicon Compounds, 1989 John Wiley and Sons Ltd, 511-533.

The melting ranges were determined according to USP 40 Class II Apparatus 1 with water as bath liquid. In the text below, the temperature at onset of melting is reported.

The particle size was determined with a Malvern Mastersizer 2000 (Malvern Instruments GmbH D-Herrenberg; measurement principle: Fraunhofer diffraction in accordance with ISO 13320). A parameter assumed for the measurement was a spherical model with a continuous phase refractive index of 1.33, a disperse phase refractive index of 1.39, and an absorption of 0.01.

The emulsions were centrifuged for 8 h at 4000/min (corresponding to around 2300×g), using a LUMiFuge® 110.2-69 (LUM GmbH Berlin) and cuvettes with path lengths of 2 mm. The stability is characterized by the instability index output by the instrument software. If this index is 0, the emulsion is stable; if it is 1, the emulsion is completely separated (cf. Dispersion Letters Technical, T4 (2013) 1-4, Update 2014).

The stability after 28 d of storage at 50° C. was assessed visually.

The emulsions, optionally together with an emulsion of amino-functional siloxanes available under the designation WACKER® FINISH CT 45 E and with zirconium acetate as an organometallic compound, are applied, in the portions as in the exemplary embodiments set out in the table, to sheetlike textile structures as follows:

A DIN A4 size piece of bleached, untreated polyester-cotton popeline (65% PET, 35% CO) is used, with a basis weight of 185 g/m².

The fabric is immersed in each case into an aqueous liquor, with a respective liquor concentration as described in table 2, and then squeezed off with a two-roll pad-mangle to a wet pickup of 50%, stretched out and dried in a Mathis laboratory tenter frame at 150° C. for 5 minutes. The material is thereafter conditioned for at least 72 hours in a conditioning chamber at 23° C. and 60% humidity, to condition it sufficiently for the purpose of determination of the hydrophobization.

The hydrophobicity of the treated textiles is tested via spray testing in accordance with AATCC Test Method No. 22-2005. In this test, the textiles are spotted with deionized water. The outcome, from comparing the spotted textile surface with the rating pictures in the description of the method, provides an approximate indication of the % of the area that has remained unwetted. A spray value of 100 denotes a completely unwetted textile.

Furthermore, the water repellency properties were tested by means of rain-shower testing according to DIN EN 29865:1993 (familiar to the skilled person as the "Bundesmann test"). In this test, after 10 minutes of irrigation, a visual evaluation is undertaken and a determination made of the water uptake of the sample in %. The visual evaluation recognizes the following stages: 5: small drops run off briskly; 4: larger drops are formed; 3: drops remain on the sample in places; 2: sample partially wetted; 1: sample wetted over the whole area.

To investigate the wash fastness properties, all of the finished textiles are washed once together with about 2 kg of ballast fabric in a MIELE Softtronic W 1935 household washing machine using the Express 20 wash program at 40° C. for 20 minutes, and spun. Added as a laundering surfactant are 5 g of a Henkel "Spee Feinwaschmittel" liquid laundry detergent. The material is subsequently dried and conditioned in the conditioning chamber for at least 12 hours at 23° C. and 60% humidity.

To remove the creasing resulting from the wash, the test specimens are ironed using a Philips Azur 4043 iron on setting II. The swatches are then again tested for hydrophobicity by the spraying test method.

EXAMPLE A1

ß-Ketocarbonyl-Functional Organosilicon Compound A1

750 g of a polysiloxane terminated with trimethylsilyl end groups and consisting of (3-aminopropyl)methylsiloxy and dimethylsiloxy units, with a dynamic viscosity of 18 800 mPas and an amine number of 0.094 mmol/g, are heated with stirring together with 38.67 g of alkylketene dimer (available under the name Wilfawax® AKD 67 from Wilmar Oleo B. V.). The alkylketene dimer was prepared from a mixture of palmitic/stearic acids (about 35/65), resulting in a C14/C16 alkyl radical $R^3$. The alkylketene dimer had an iodine number of 45.5 g $I_2$/100 g. The mixture is fully melted at 60° C. On attainment of 80° C., stirring takes place at 80° C. for 15 minutes. After cooling to room temperature, the product is a yellowish solid wax (melting onset 49° C.) of a ß-ketocarbonyl-functional organopolysiloxane A1 in which 98.6% of the original diketene groups have been converted (as measured by $^1$H NMR spectroscopy).

EXAMPLE A2

ß-Ketocarbonyl-Functional Organosilicon Compound A2

1000 g of a polysiloxane terminated with trimethylsilyl end groups and consisting of (3-aminopropyl)methylsiloxy and dimethylsiloxy units, with a dynamic viscosity of 1870 mPas and an amine number of 0.128 mmol/g, are heated with stirring together with 70.24 g of alkylketene dimer (available under the name Wilfawax® AKD 67 from Wilmar Oleo B. V.). The mixture is fully melted at 60° C. On attainment of 80° C., stirring takes place at 80° C. for 15 minutes. After cooling to room temperature, the product is a yellowish solid wax (melting onset 41° C.) of a ß-ketocarbonyl-functional organopolysiloxane A2 in which 97.0% of the original diketene groups have been converted (as measured by $^1$H NMR spectroscopy).

EXAMPLE A3

ß-Ketocarbonyl-Functional Organosilicon Compound A3

750 g of a polysiloxane terminated with trimethylsilyl end groups and consisting of (3-aminopropyl)methylsiloxy and dimethylsiloxy units, with a dynamic viscosity of 12 100 mPas and an amine number of 0.05 mmol/g, are heated with stirring together with 20.97 g of alkylketene dimer (available under the name Wilfawax® AKD 67 from Wilmar Oleo B. V.). The mixture is fully melted at 60° C. On attainment of 80° C., stirring takes place at 80° C. for 15 minutes. After cooling to room temperature, the product is a yellowish solid wax (melting onset 42° C.) of a β-ketocarbonyl-functional organopolysiloxane A3 in which 98.6% of the original diketene groups have been converted (as measured by $^1$H NMR spectroscopy).

EXAMPLE A4

β-Ketocarbonyl-Functional Organosilicon Compound A4

1000 g of a polysiloxane terminated with trimethylsilyl end groups and consisting of (3-aminopropyl)methylsiloxy and dimethylsiloxy units, with a dynamic viscosity of 8120 mPas and an amine number of 0.048 mmol/g, are heated with stirring together with 26.32 g of alkylketene dimer (available under the name Wilfawax® AKD 67 from Wilmar Oleo B. V.).

The mixture is fully melted at 60° C. On attainment of 80° C., stirring takes place at 80° C. for 15 minutes. After cooling to room temperature, the product is a yellowish solid wax (melting onset 38° C.) of a ß-ketocarbonyl-functional organopolysiloxane A4 in which 97.8% of the original diketene groups have been converted (as measured by $^1$H NMR spectroscopy).

EXAMPLE A5

β-Ketocarbonyl-Functional Organosilicon Compound A5

300 g of a polysiloxane terminated with trimethylsilyl end groups and consisting of (3-aminopropyl)methylsiloxy and dimethylsiloxy units, with a dynamic viscosity of 1520 mPas and an amine number of 0.266 mmol/g, are heated with stirring together with 43.78 g of alkylketene dimer (available under the name Wilfawax® AKD 67 from Wilmar Oleo B. V.).

The mixture is fully melted at 60° C. On attainment of 80° C., stirring takes place at 80° C. for 15 minutes. After cooling to room temperature, the product is a yellowish solid wax (melting onset 43° C.) of a β-ketocarbonyl-functional organopolysiloxane A5 in which 99.1% of the original diketene groups have been converted (as measured by $^1$H NMR spectroscopy).

EXAMPLE C1

Not Inventive 200 g of β-ketocarbonyl-functional organosilicon compound A1 are melted at 60° C. 8.88 g of a 90% aqueous solution of isotridecyl decaethoxylate, purchasable under the tradename MARLIPAL® O13/109 (from SASOL), and 7.12 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a solid, stiff phase in the form of a preliminary emulsion. This emulsion is diluted slowly with 184.24 g of fully demineralized water, with slight shearing, to give the desired emulsion. Added as a preservative is 0.36 g of ACTICIDE® MV (Thor Chemie GmbH Speyer). The result is a milky white dispersion having an average particle size D(50) of 0.441 μm and a pH of 6.5.

EXAMPLE C2

Not Inventive 200 g of ß-ketocarbonyl-functional organosilicon compound A1 are melted at 60° C. 4.44 g of a 90% aqueous solution of isotridecyl decaethoxylate, purchasable under the tradename MARLIPAL® O13/109 (from SASOL), 4.00 g of isotridecylpenta-ethoxylate, purchasable under the tradename Lutensol TO 5, and 7.56 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a solid, stiff phase in the form of a preliminary emulsion. This emulsion is diluted slowly with 184.24 g of fully demineralized water, with slight shearing, to give the desired emulsion. Added as a preservative is 0.36 g of ACTICIDE® MV (Thor Chemie GmbH Speyer). The result is a milky white dispersion having an average particle size D(50) of 0.481 μm and a pH of 6.5.

EXAMPLE C3

Not Inventive 200 g of ß-ketocarbonyl-functional organosilicon compound A1 are melted at 60° C. 12.0 g of lauric acid (Acros Organics, Geel BE), 7.84 g of an aqueous solution of potassium hydroxide (50%), and 4.0 g of polyoxyethylene (4)lauryl ether, purchasable under the tradename Sympatens-ALM/040 (from Kolb) and 4.08 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a firm, stiff phase in the form of a preliminary emulsion. This emulsion is diluted slowly with 171.32 g of fully demineralized water, with slight shearing, to give the desired emulsion. Added as a preservative is 0.36 g of ACTICIDE® MV (Thor Chemie GmbH Speyer). The result is a milky white dispersion having an average particle size D(50) of 0.766 µm and a pH 10.0. At lower pH values, the emulsion breaks down immediately.

EXAMPLE C4

Not Inventive 200 g of ß-ketocarbonyl-functional organosilicon compound A1 are melted at 60° C. 4.0 g of Laureth 4, purchasable under the tradename SP BRIJ® L4 MBAL-LQ-(SG) (Croda GmbH Nettetal), 6.0 g of Laureth 23, purchasable under the tradename SP BRIJ® L23 MBAL-LQ-(RB) (Croda GmbH Nettetal) and 8.0 g of water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a creamy mixture in the form of a preliminary emulsion. This emulsion is diluted slowly with 181.24 g of fully demineralized water, with slight shearing, to give the desired emulsion. Added as a preservative is 0.36 g of ACTICIDE® MV (Thor Chemie GmbH Speyer). The inhomogeneous mixture is not dilutable with water and thus is unusable.

EXAMPLE C5

Not Inventive 200 g of ß-ketocarbonyl-functional organosilicon compound A1 are melted at 60° C. 15.0 g of a 40% aqueous solution of an ethoxylated castor oil having 200 ethylene glycol units, purchasable under the tradename HEDIPIN® R/2000 G (Kolb Distribution Ltd. Hedingen, CH), 6.0 g of isotridecylpenta-ethoxylate, purchasable under the tradename Lutensol TO 5 are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a creamy mixture in the form of a preliminary emulsion. This emulsion is diluted slowly with 178.24 g of fully demineralized water, with slight shearing, to give the desired emulsion. Added as a preservative is 0.36 g of ACTICIDE® MV (Thor Chemie GmbH Speyer). The mixture on dilution becomes increasingly more viscous and is not dilutable with water and thus is unusable.

EXAMPLE C6

Not Inventive 200 g of β-ketocarbonyl-functional organosilicon compound A1 are melted at 60° C. 12.0 g of isotridecyl hexadecaethoxylate, purchasable under the tradename IMBENTIN® T/77 (Kolb Distribution Ltd. Hedingen, CH) and 8.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a firm, stiff phase in the form of a preliminary emulsion. This emulsion is diluted slowly with 179.24 g of fully demineralized water, with slight shearing, to give the desired emulsion. Added as a preservative is 0.36 g of ACTICIDE® MV (Thor Chemie GmbH Speyer). The result is a milky white dispersion having an average particle size D(50) of 0.270 µm and a pH of 6.0.

EXAMPLE C7

Not Inventive 200 g of ß-ketocarbonyl-functional organosilicon compound A1 are melted at 60° C. 6.68 g of a 90% aqueous solution of isotridecyl decaethoxylate, purchasable under the tradename MARLIPAL® O13/109 (SASOL GmbH Marl), 12.6 g of a 30% aqueous solution of cetyltrimethylammonium chloride, purchasable under the tradename GENAMIN® CTAC (Clariant SE Sulzbach am Taunus) are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a creamy mixture in the form of a preliminary emulsion. This emulsion is diluted slowly with 179.96 g of fully demineralized water, with slight shearing, to give the desired emulsion. Added as a preservative is 0.36 g of ACTICIDE® MV (Thor Chemie GmbH Speyer). The inhomogeneous mixture is not dilutable with water and thus is unusable.

EXAMPLE C8

Not Inventive 200 g of ß-ketocarbonyl-functional organosilicon compound A1 are melted at 60° C. 18.0 g of a 66% aqueous solution of sodium diisodecylsulfosuccinate, purchasable under the tradename
Disponil SUS IC 10 (BASF SE Ludwigshafen) are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a creamy mixture in the form of a preliminary emulsion. This emulsion is diluted slowly with 181.64 g of fully demineralized water, with slight shearing, to give the desired emulsion. Added as a preservative is 0.36 g of ACTICIDE® MV (Thor Chemie GmbH Speyer). The resultant milky emulsion undergoes separation after just a few hours.

EXAMPLE C9

Not Inventive 250 g of β-ketocarbonyl-functional organosilicon compound A4 are melted at 60° C. 15.0 g of sodium N-lauroylsarcosine, purchasable from Merck KGaA Darmstadt, and 10 g of water are homogenized with an ULTRA-TURRAX® T50 (from Janke & Kunkel/IKA) for 4 minutes at a rotary speed of 6000/min (corresponding to a peripheral speed of around 12 m/s). The product is a creamy mixture in the form of a preliminary emulsion. This emulsion is diluted slowly with 205.95 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.664 μm and pH of 7.5.

EXAMPLE C10

Not Inventive 250 g of ß-ketocarbonyl-functional organosilicon compound A4 are melted at 60° C. 10.0 g of sorbitan stearate (available under the name Span 60 from Croda GmbH Nettetal), 5 g of Polysorbat 60 (available under the name Tween 60 from Croda
GmbH Nettetal), and 10 g of water are homogenized with an ULTRA-TURRAX® T50 (from Janke & Kunkel/IKA) for 4 minutes at a rotary speed of 6000/min (corresponding to a peripheral speed of around 12 m/s). The product is a creamy mixture in the form of a preliminary emulsion. This emulsion is diluted slowly with 225 g of fully demineralized water. This results in an inhomogeneous mixture, which can no longer be dispersed in water.

EXAMPLE I1

Inventive 250 g of ß-ketocarbonyl-functional organosilicon compound A1 are melted at 60° C. 15.0 g of oleic acid (Bernd Kraft GmbH Duisburg), 7.5 g of triethanolamine and 10.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a firm, crumbly, stiff phase having a yield point of 3240 Pa in the form of a preliminary emulsion. This emulsion is diluted slowly with 216.55 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.506 μm and a pH of 8.0.

EXAMPLE I2

Inventive 250 g of ß-ketocarbonyl-functional organosilicon compound A5 are melted at 60° C. 15.0 g of lauric acid (Acros Organics, Geel BE), 7.5 g of triethanolamine and 10.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a crumbly phase having a yield point of 3540 Pa in the form of a preliminary emulsion. This emulsion is diluted slowly with 216.55 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.226 μm and a pH of 7.5.

EXAMPLE I3

Inventive 250 g of ß-ketocarbonyl-functional organosilicon compound A3 are melted at 60° C. 25.0 g of linoleic acid (Sigma Aldrich Chemie GmbH, Steinheim), 12.5 g of triethanolamine and 10.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a very firm, crumbly phase having a yield point of 5820 Pa in the form of a preliminary emulsion. This emulsion is diluted slowly with 415.85 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.420 μm and a pH of 8.0.

EXAMPLE I4

Inventive 250 g of β-ketocarbonyl-functional organosilicon compound A3 are melted at 60° C. 25.0 g of docosanoic acid (Acros Organics, Geel BE), 12.5 g of triethanolamine and 10.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a firm phase having a yield point of 4300 Pa in the form of a preliminary emulsion. This emulsion is diluted slowly with 415.85 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.760 μm and a pH of 8.0.

EXAMPLE I5

Inventive 175 g of ß-ketocarbonyl-functional organosilicon compound A4 are melted at 60° C. 25.0 g of oleic acid (Bernd Kraft GmbH Duisburg), 12.5 g of triethanolamine and 10.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a creamy phase having a yield point of 610 Pa in the form of a preliminary emulsion. This emulsion is diluted slowly with 276.85 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.455 μm and a pH of 8.5.

EXAMPLE I6

Inventive 250 g of ß-ketocarbonyl-functional organosilicon compound A4 are melted at 60° C. 15.0 g of palmitic acid (Sigma-Aldrich GmbH), 7.5 g of triethanolamine and 10.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a firm, doughy phase having a yield point of 5210 Pa in the form of a preliminary emulsion. This emulsion is diluted slowly with 216.55 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.754 µm and a pH of 8.5.

EXAMPLE I7

Inventive 250 g of β-ketocarbonyl-functional organosilicon compound A4 are melted at 60° C. 25.0 g of stearic acid (Fisher Scientific, Loughborough UK), 12.5 g of triethanolamine and 10.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a thick, creamy phase having a yield point of 1400 Pa in the form of a preliminary emulsion. This emulsion is diluted slowly with 201.55 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.650 µm and a pH of 8.5.

EXAMPLE I8

Inventive 250 g of β-ketocarbonyl-functional organosilicon compound A4 are melted at 60° C. 25.0 g of palmitic acid (Fisher Scientific, Loughborough UK), 12.5 g of triethanolamine and 10.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a thick, crumbly phase having a yield point of 6820 Pa in the form of a preliminary emulsion. This emulsion is diluted slowly with 201.55 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.478 µm and a pH of 8.5.

EXAMPLE I9

Inventive 175 g of ß-ketocarbonyl-functional organosilicon compound A3 are melted at 60° C. 25.0 g of oleic acid (Bernd Kraft GmbH Duisburg), 7.5 g of triethanolamine and 10.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a thick, crumbly phase having a yield point of 4500 Pa in the form of a preliminary emulsion. This emulsion is diluted slowly with 280 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.859 µm and a pH of 8.0.

EXAMPLE I10

Inventive 175 g of β-ketocarbonyl-functional organosilicon compound A3 are melted at 60° C. 25.0 g of oleic acid (Bernd Kraft GmbH Duisburg), 15 g of triethanolamine and 10.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a thick, crumbly phase having a yield point of 5380 Pa in the form of a preliminary emulsion. This emulsion is diluted slowly with 274.55 g of fully demineralized water, with slight shearing, to give the desired emulsion. Added as a preservative is 0.45 g of
ACTICIDE® MV (Thor Chemie GmbH Speyer). The result is a milky white dispersion having an average particle size D(50) of 0.416 µm and a pH of 8.5.

EXAMPLE I11

Inventive 250 g of β-ketocarbonyl-functional organosilicon compound A4 are melted at 60° C. 12.5 g of oleic acid (Bernd Kraft GmbH Duisburg), 12.5 g of linoleic acid (Sigma Aldrich Chemie GmbH, Steinheim), 12.5 g of triethanolamine and 10.0 g of fully demineralized water are added and the mixture is homogenized with an ULTRA-TURRAX® T50 (from Janke & Kunkel/IKA) for 4 minutes at a rotary speed of 6000/min (corresponding to a peripheral speed of around 12 m/s). The product is a thick, crumbly phase having a yield point of 2040 Pa in the form of a preliminary emulsion. This emulsion is diluted slowly with 260 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.629 µm and a pH of 7.5.

EXAMPLE I12

Inventive 250 g of β-ketocarbonyl-functional organosilicon compound A4 are melted at 60° C. 15.0 g of lauric acid (Acros Organics, Geel BE), 7.5 g of triethanolamine and 10.0 g of fully demineralized water are added and the mixture is homogenized with an ULTRA-TURRAX® T50 (from Janke & Kunkel/IKA) for 3 minutes at a rotary speed of 6000/min (corresponding to a peripheral speed of around 12 m/s). The product is a crumbly phase having a yield point of 6330 Pa in the form of a preliminary emulsion. This emulsion is diluted slowly with 216.55 g of fully demineralized water, with slight shearing, to give the desired emulsion. Added as a preservative is 0.45 g of ACTICIDE® MV (Thor Chemie GmbH Speyer). The result is a milky white dispersion having an average particle size D(50) of 0.288 μm and a pH of 7.5.

The emulsion properties are summarized in table 1.

TABLE 1 emulsion properties

| Example | D(50) in μm | pH | Instability index after 8 h/4000/min | Stability 28 d 50° C. |
|---|---|---|---|---|
| C1 | 0.441 | 6.5 | 0.137 | sat.* |
| C2 | 0.481 | 6.5 | 0.167 | sat. |
| C3 | 0.766 | 10.0 | 0.314 | 30% serum** |
| C4 | | | inhomogeneous undilutable | |
| C5 | | | inhomogeneous undilutable | |
| C6 | 0.270 | 6.0 | 0.102 | sat. |
| C7 | | | inhomogeneous undilutable | |
| C8 | | | inhomogeneous undilutable | |
| C9 | 0.664 | 7.5 | 0.143 | 15% serum |
| C10 | | | inhomogeneous undilutable | |
| I1 | 0.506 | 8.0 | 0.046 | sat. |
| I2 | 0.226 | 7.5 | 0.018 | sat. |
| I3 | 0.420 | 8.0 | 0.087 | sat. |
| I4 | 0.760 | 8.0 | 0.186 | sat. |
| I5 | 0.455 | 8.5 | 0.021 | sat. |
| I6 | 0.754 | 8.5 | 0.240 | sat. |
| I7 | 0.650 | 8.5 | 0.013 | sat. |
| I8 | 0.478 | 8.5 | 0.009 | sat. |
| I9 | 0.859 | 8.0 | 0.064 | sat. |
| I10 | 0.416 | 8.5 | 0.008 | sat. |
| I11 | 0.629 | 7.5 | 0.017 | sat. |
| I12 | 0.288 | 7.5 | 0.028 | sat. |

*sat. = satisfactory
**serum denotes a visible separation of relatively thin emulsion or water on the base of the vessel.

The emulsions of the invention are stable and exhibit predominantly much better stabilities than the comparative experiments. The comparative experiments show, moreover, that the β-ketocarbonyl-functional organosilicon compounds cannot be emulsified with any desired emulsifiers, as for example any desired ethoxylated alcohols, of the kind hitherto stated generally, for example, in US 2009/0144912 A1 and US 2016/0121239 A1.

Use examples: the formulations of the use examples CU1 to CU3 and also CU6 and CU9 (not inventive) and IU1 to IU12 (inventive) are compiled in table 2. The emulsions which were inhomogeneous and not dilutable with water could not be tested.

TABLE 2 formulations of the liquors for finishing the fabrics

| Example | Emulsion | CT 45 E | Zr acetate |
|---|---|---|---|
| CU1 | 40 g/l C1 | — | 5 g/l |
| CU2 | 40 g/l C2 | — | 5 g/l |
| CU3 | 40 g/l C3 | — | 5 g/l |
| CU6-1 | 40 g/l C6 | — | 5 g/l |
| CU6-2 | 24.5 g/l C6 | 15.5 g/l | 5 g/l |
| CU9 | 40 g/l C9 | — | 5 g/l |
| IU1 | 40 g/l I1 | — | 5 g/l |
| IU2 | 40 g/l I2 | — | 5 g/l |
| IU3 | 40 g/l I3 | — | 5 g/l |
| IU4 | 40 g/l I4 | — | 5 g/l |
| IU5 | 40 g/l I5 | — | 5 g/l |
| IU6-1 | 40 g/l I6 | — | 5 g/l |
| IU6-2 | 24.5 g/l I6 | 15.5 g/l | 5 g/l |
| IU7-1 | 40 g/l I7 | — | 5 g/l |
| IU7-2 | 24.5 g/l I7 | 15.5 g/l | 5 g/l |
| IU8-1 | 40 g/l I8 | — | 5 g/l |
| IU8-2 | 24.5 g/l I8 | 15.5 g/l | 5 g/l |
| IU9 | 40 g/l I9 | — | 5 g/l |
| IU10 | 40 g/l I10 | — | 5 g/l |
| IU11 | 40 g/l I11 | — | 5 g/l |
| IU12 | 40 g/l I12 | — | 5 g/l |

Use examples: the test results of the use examples CU1 to CU3 and also CU6 and CU9 (not inventive) and IU1 to IU12 (inventive) are compiled in table 3.

TABLE 3 test results of the finished fabrics

| Example | Spray test | Spray test after washing | Bundesmann test Rating | Reverse side wetted | Water uptake |
|---|---|---|---|---|---|
| CU1 | 100 | 50 | 2 | yes | 14.0% |
| CU2 | 100 | 50 | 2 | yes | 10.0% |
| CU3 | finishing not possible, liquor inhomogeneous | | | | |
| CU6-1 | 100 | 60 | 1 | yes | 14.6% |
| CU6-2 | 100 | 50 | 1 | yes | 18.5% |
| CU9 | 100 | 50 | 1 | yes | 11.0% |
| IU1 | 100 | 80 | 4 | no | 7.2% |
| IU2 | 100 | 70 | 4 | no | 8.0% |
| IU3 | 100 | 80 | 4 | no | 6.2% |
| IU4 | 100 | 80 | 4 | no | 5.9% |
| IU5 | 100 | 70 | 4 | no | 7.6% |
| IU6-1 | 100 | 70 | 4 | no | 6.4% |
| IU6-2 | 100 | 60 | 2 | yes | 10.7% |
| IU7-1 | 100 | 70 | 4 | no | 6.4% |
| IU7-2 | 100 | 60 | 3 | yes | 10.0% |
| IU8-1 | 100 | 80 | 4 | no | 6.0% |
| IU8-2 | 100 | 60 | 2 | yes | 10.3% |
| IU9 | 100 | 70 | 3 | no | 7.9% |
| IU10 | 100 | 70 | 4 | no | 7.2% |
| IU11 | 100 | 80 | 4 | no | 6.7% |
| IU12 | 100 | 80 | 4 | no | 6.6% |

The inventive emulsions IU1 to IU12, in comparison to the noninventive emulsions CU1, CU2 and CU6, with the noninventive emulsion CU3 being not stable or dilutable at all, surprisingly exhibit a much better hydrophobilizing effect, particularly in the case of the relatively strict Bundesmann test, also in terms of the wash resistance.

All of the textiles finished exhibited a pleasant soft hand.

The invention claimed is:

1. An aqueous emulsion, comprising:
(A) β-ketocarbonyl-functional organosilicone compound(s) which comprise at least one Si-bonded radical A of the formula

$$(Si)-L^1-[X^1-L^2-]_xX^2 \quad (I)$$

where
$L^1$ is identical or different and is a divalent, Si—C-bonded hydrocarbon radical having 1 to 18 carbon atoms,
$L^2$ is identical or different and is a divalent hydrocarbon radical having 1 to 6 carbon atoms,
$X^1$ is a radical of the formula —O—, —NZ—, —NR²— or —S—,
$X^2$ is a radical of the formula —O—Z, —NH—Z, —NR²—Z, —S—Z,
Z is a radical of the formula —C(=O)—CHR³—C(=O)—CH₂R³,
$R^2$ is a monovalent hydrocarbon radical having 1 to 18 carbon atoms, $R^3$ is a monovalent, optionally substituted hydrocarbon radical having at least 12 carbon atoms,
y is 0, 1, 2 or 3, and
(Si)— denotes the bond to an Si atom,
  (B) at least one salt of a saturated or unsaturated fatty acid having at least 10 carbon atoms as an emulsifier, and
  (C) water,
with the proviso that no nonionic emulsifiers having an HLB of less than 15 are employed.

2. The aqueous emulsion of claim 1, wherein $R^3$ has at least 14 carbon atoms.

3. The aqueous emulsion of claim 1, wherein y is 0 or 1.

4. The aqueous emulsion of claim 1, wherein $X^1$ is a radical —NZ— and $X^2$ is a radical —NH—Z.

5. The aqueous emulsion of claim 1, wherein no further emulsifiers (D), which are different from the emulsifiers (B) are employed.

6. The aqueous emulsion of claim 1, wherein the aqueous emulsion further comprises:
  (E) nonaqueous solvents or coemulsifiers.

7. The aqueous emulsion of claim 1, wherein the aqueous emulsion further comprises:
  (F) auxiliaries selected from the group of pH regulators, foam inhibitors, thickeners, protective colloids, preservatives, disinfectants, wetting agents, corrosion inhibitors, dyes, fragrances, non-(A) siloxanes, and mixtures thereof.

8. The aqueous emulsion of claim 1, wherein at least one β-ketocarbonyl-functional organosilicone compound (A) comprises:
  organopolysiloxanes of the formula

where
A is a radical of the formula (I),
R is a monovalent, optionally substituted hydrocarbon radical having 1 to 18 carbon atoms per radical,
$R^1$ is hydrogen or an alkyl radical having 1 to 8 carbon atoms,
$R^4$ is identical or different and is a radical R or —$OR^1$,
d is 0 or 1,
e is 0 or an integer from 1 to 2000, and
f is 0 or an integer from 1 to 20,
with the proviso that there is on average at least one radical A per molecule and that, respectively,
if d is 0, f is not 0, and
if f is 0, d is 1.

9. A method for producing an aqueous emulsion of claim 1, comprising mixing:
  (A) β-ketocarbonyl-functional organosilicone compound(s) of claim 1 with
  (B) at least one salt of a saturated or unsaturated fatty acid having at least 10 carbon atoms,
  (C) water,
  (D) optionally further emulsifiers
  (E) optionally nonaqueous solvents or coemulsifiers, and
  (F) optionally auxiliaries,
with the proviso that no nonionic emulsifiers having an HLB of less than 15.

10. A method of finishing fibrous substrates, with a composition comprising contacting the fibrous substrates with an aqueous emulsion of claim 1.

11. A composition, comprising:
  an aqueous emulsion of claim 1,
  amino-functional organosilicone compounds (G) or aqueous emulsions (G') thereof, and
  optionally at least one organometallic compound (H).

12. The composition of claim 11, wherein amino-functional organosilicone compounds (G) comprise:
  organopolysiloxanes of the formula

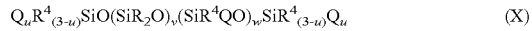

where
Q is a radical of the formula

R is a monovalent, optionally substituted hydrocarbon radical having 1 to 18 carbon atoms per radical,
$R^4$ is identical or different and is a radical R or $OR^1$, where $R^1$ is hydrogen or an alkyl radical having 1 to 8 carbon atoms,
$L^1$ is identical or different and is a divalent, Si—C-bonded hydrocarbon radical having 1 to 18 carbon atoms,
$L^2$ is identical or different and is a divalent hydrocarbon radical having 1 to 6 carbon atoms,
$X^5$ is a radical of the formula —NH— or —$NR^2$—,
$X^6$ is a radical of the formula —$NH_2$ or —$NR^2H$,
$R^2$ is a monovalent hydrocarbon radical having 1 to 18 carbon atoms,
(Si)— denotes a bond to the Si atom,
u is 0 or 1,
v is 0 or an integer from 1 to 2000, and
w is 0 or an integer from 1 to 20,
z is 0, 1, 2 or 3,
with the proviso that there is on average at least one radical Q per molecule, meaning that, respectively,
if u is 0, w is not 0, and
if w is 0, u is 1.

13. The composition of claim 11, wherein organometallic compounds (H) comprise amines, alkoxides, carboxylic acid salts, phosphoric acid salts or chelates of metals selected from the group of Pb, Zn, Zr, Sb, Fe, Cd, Sn, Ti, Ba, Ca, Mn, V, Al, and Co.

14. The composition of claim 11, wherein organometallic compounds (H) comprise butyl titanate, zirconium octoate or zirconium acetate.

15. The method of claim 14, wherein the composition is applied to the fibrous substrate, and subsequently the treated fibrous substrate, are allowed to dry.

16. A method for finishing fibrous substrates comprising contacting the fibrous substrate with a composition of claim 11.

* * * * *